United States Patent [19]

Faul et al.

[11] Patent Number: 4,620,439

[45] Date of Patent: Nov. 4, 1986

[54] METHOD FOR DETERMINING BOREHOLE OR CAVITY CONFIGURATION THROUGH INERT GAS INTERFACE

[75] Inventors: Donald Faul, Sunset; Paul P. Broussard, Lafayette; Donald W. Granger, Lake Charles, all of La.

[73] Assignee: Testrac, Inc., Lake Charles, La.

[*] Notice: The portion of the term of this patent subsequent to Jun. 26, 2001, has been disclaimed.

[21] Appl. No.: 677,699

[22] Filed: Dec. 3, 1984

Related U.S. Application Data

[63] Continuation-in-part of Ser. No. 599,290, Apr. 11, 1984, Pat. No. 4,523,453, which is a continuation-in-part of Ser. No. 390,321, Jun. 21, 1982, Pat. No. 4,455,869.

[51] Int. Cl.$^4$ ............................................. G01M 3/00
[52] U.S. Cl. ..................... 73/40.7; 73/149; 73/155
[58] Field of Search ............... 73/40, 40.7, 149, 155; 166/250; 222/77

[56] References Cited

U.S. PATENT DOCUMENTS

| | | | |
|---|---|---|---|
| 1,994,337 | 3/1935 | Endacott | 222/77 X |
| 2,792,708 | 5/1957 | Johnston, Jr. et al. | 73/149 |
| 3,958,443 | 5/1976 | Berrettini | 73/861.01 X |
| 4,455,869 | 6/1984 | Broussard et al. | 73/149 X |
| 4,523,453 | 6/1985 | Faul et al. | 73/155 X |

OTHER PUBLICATIONS

Beasley, R. R. Strategic Petroleum Reserve . . . and Analysis, Nov. 30, 1982, Sandia National Labs Release 2070, pp. 1–143.

Primary Examiner—Jerry W. Myracle
Attorney, Agent, or Firm—Pravel, Gambrell

[57] ABSTRACT

A method for determining the erosion of a borehole or cavity by providing a source of liquid inert gas, preferably nitrogen, placing the inert gas in a storage tank, and suspending the storage tank so that one may determine the actual weight of the nitrogen as it is withdrawn from the tank in liquid state. There is further provided hydraulic elements for lifting or lowering the storage tanks suspended from a weight cell as a tank is placed into use or non-use. Further, the liquid nitrogen is pumped from the storage tank with the use of a reciprocating pump, and converted into gaseous nitrogen (in the state of 100° F.) and is injected into a borehole or the like. The nitrogen gas is then allowed to flow under a certain pressure down the borehole, and due to the properties of nitrogen gas, the nitrogen interfaces at a horizontal plane as it moves down the borehole. Following completion of the nitrogen injection, nitrogen gas could be maintained within the borehole at a constant pressure and any upward movement of the interface over an extended and defined period of time, could determine location and the amount of leakage occurring within the borehole, casing seat or pipe. A Flowmeter may be used to measure the amount of inert gas injected.

3 Claims, 2 Drawing Figures

METHOD FOR DETERMINING BOREHOLE OR CAVITY CONFIGURATION THROUGH INERT GAS INTERFACE

This application is a continuation-in-part of a previous application by the same inventors bearing U.S. Ser. No. 599,290, filed Apr. 11, 1984, now U.S. Pat. No. 4,523,453, which was a continuation-in-part of application U.S. Ser. No. 390,321, filed June 21, 1982, and which issued as U.S. Pat. No. 4,455,869, issued on June 26, 1984, and assigned to Testrac, Inc., recorded in the U.S. Patent and Trademark Office at Reel 4228, Frame 0637.

BACKGROUND OF THE INVENTION

1. Field of the Invention

This invention relates to the measurement of boreholes and underground caverns. More particularly, this invention relates to determining the configuration of a borehole by introducing an inert gas, such as nitrogen, into the borehole, and determining the weight of the nitrogen being introduced with the use of a flow meter apparatus, and monitoring the movement of the nitrogen gas interface down the borehole for determining the borehole configuration. Having determined the configuration of the borehole, any movement of the nitrogen interface upward or downward over a period of time indicates the relative location and amount of leakage that may be occurring from the storage cavern or wellhead area.

2. General Background

In the oil and gas industry, and in other related industries where there are storage caverns and the like within the earth for storing minerals such as oil, natural gas, sulphur, etc., these caverns, often being at a great depth beneath the surface of the earth, are reached through the use of boring a borehole from the surface of the earth down into the cavern. The borehole, of course, would accommodate the flow of minerals that are to be stored in the storage cavern both downward, and the movement of the minerals up through the borehole, of course, would accommodate the flow of minerals that are to be stored in the storage cavern both downward, and the movement of the minerals up through the borehole as the minerals are utilized. After a certain depth, these boreholes are simply holes drilled within the earth and have no pipe or casing to support the walls which may serve to prevent erosion or the like of the walls of the borehole. That being the case, in the preparation of the cavern by inserting salt water, or in the insertion of or the retrieval of the liquid minerals that are flowing through the borehole, the walls of the borehole become eroded, and the borehole itself may be in such a state that it is no longer effective in being used as a conduit for the passage of minerals and the like into the cavern.

Therefore, it is essential in the storage of such minerals and the preparation of the cavern, that the boreholes are carefully monitored in order to determine whether or not the borehole is in the proper shape that it is not so eroded that it is ineffective in its use. Likewise, often the configuration of the cavern itself is measured in order to determine the extent of erosion of the cavern. Also, following the determination of the configuration of the borehole, one may determine this in the process of the present invention, by the relative movement of the interface either upward or downward over a given period of time, whether or not there is leakage occurring in the cavern or at the casing seat, in order to ascertain that the borehole and cavern are in proper shape for storage of minerals or the like.

One known process for measuring the configuration of the borehole is to use an inert gas such as nitrogen gas and insert it down the hole. The pressure of the gas is measured as it leaves its source, and a measurement is attempted in order to determine how much gas is being used to fill a certain void within the borehole. What is utilized in the present state of the art is a measuring device which is marketed under the trademark of a "Barton Gauge" which records the number of inches of nitrogen being pumped out of the tank. This particular method falls very short of being in the least bit accurate, and is totally ineffective. At present, both governmental and industry requirements are such that the amount of inert gas being used to measure the configuration of the borehole must be within five pounds of the actual amount being pumped down the hole, and under the present method, this determination is ineffective.

There have been several patents which speak to the measurement of pressure, etc. either down the borehole or methods of determining the size of an orifice, the most pertinent being as follows:

U.S. Pat. No. 2,374,154 issued to C. B. Moore entitled "Comparator Gauge" teaches the use of a type of pneumatic guage for recording demensions of an internal bore at successive locations down the borehole. Essentially, the apparatus includes a transmitter head with a pressure transmitter within on the end of a flexible tube which is able to extend the length of the bore to be measured. It further provides an air compressor which supplies pressurized fluid to a receiver through the supply pipe to pressure regulators. The fluid supplied to the transmitter head is then delivered through the bore to the fluid pressure chamber. The apparatus then provides a readout of the pressurization within the bore which is then transmitted into a chart as the transmitter is moved down periodically the borehole. This apparatus in no way measures the configuration of the borehole due to the change in the weight of the measuring medium such as in this case, nitrogen.

U.S. Pat. No. 2,513,374 isued to C. Stead, et al entitled "Measuring Apparatus for Gauge Determination of Dimensions of Bodies with Flow of Fluid Under Pressure From an Orifice"[teaches the use of a measuring apparatus which has the capability of gauging dimensions of bodies by comparison with those of a master or standard, and determining the deviation from the "standard." The apparatus uses a Venturi means for providing differential fluid pressure for efficient operation of a gauge meter such as air and to permit bi-manual manipulation adjustment of a valve to 0 for comparatively measuring the dimensions of the body. In the claims of this particular patent, there is claimed a Venturi means as part of the combination for responding to the differential pressures and verifying the dimensions of the orifice being engaged.

U.S. Pat. No. 1,919,546 isssued to H. W. Fletcher entitled "Method and Apparatus for Testing Internal Diameter of Tubes" teaches the use of a device for testing the uniformity of the internal diameter of tubes so that inequalities within the internal walls of the tubes may be found. The invention is carried out by noting the amount of fluid that leaks past a cylinder of uniform diemater that moves within the tube. This is quite unlike the invention which relys on the interfacting of the layer of nitrogen with the atmosphere as it moves down the hole and conforms itself to the irregularities within the borehole. Please note also in the claims that there is claimed a gauge piston form to fit the tube loosely, and the other mechanisms which relate to this type of measurement.

U.S. Pat. No. 2,669,864 issued to O. C. Brewster entitled "pneumatic Bore Gauge" is basically an improvement patent upon pneumatic bore gauges of that time by having the ability to use a bore head to obtain the results of a two-range diameter of the hole. As with the other patent, what is required in this patent is an apparatus having a head which goes down the bore hole for determining the shape of the hole. And there appears to be no language in the patent which does teach the use of this particular apparatus down an oil well bore and is simply a patent on an improved bore head.

U.S. Pat. No. 4,000,655 issued to Jones entitled "Measuring Devices for Bores and Ducts" teaches the use of a means for measuring the irregularities on the inner surface of a pipeline by having a fluid filled envelope whereby the surface of the envelope would fill the irregularities of the hole. There would be a means for sensing the pressure variations within the envelope.

U.S. Pat. No. 3,456,504 issues to C. C. Bombardieri entitled "Sampling Method" teaches the use of a method for analyzing the subsurface formation by introducing two types of fluid at a selected ratio and analyzing the fluid following their injections into the formation.

U.S. Pat. No. 3,502,169 issued to J. E. Chapman, III entitled "Sonic Borehole Televiewer Apparatus" teaches the use of an electrical instrument for situating within a borehole and the apparatus responding to changes in the emissions within the hole and recording a record of the surface of the borehole wall.

U.S. Pat. No. 4,155,248 issued to Wagner, et al entitled "Method and Apparatus for Determining the Pressure Drop and Circumference of Filter Rods" teaches the use of a method for determining the circumference of and the pressure drop of filter rods for cigarette filters or the like.

U.S. Pat. No. 3,841,152 issued to Guest entitled "Drilling Conditions Monitor" teaches the use of a system which produces a digital readout for recording the pressure of the fluid circulating in the well bore and in doing so to detect a "kick" shortly after it occurs and take corrective action in order to prevent a blowout.

U.S. Pat. No. 3,172,129 issued to Rhoades entitled "Simplified Wellbore Pressure Testing Apparatus" for determining the bottom hole pressure in an oil well by use of a combination of instruments and recording the change in the pressure.

U.S. Pat. No. 4,250,947 issued to Heilhecker, et al entitled "Apparatus and Method for Detecting Abnormal Drilling Conditions" is done by monitoring mud volume of the mud system or the rate of change in the mud volume for detecting the abnormal conditions when the rate of makeup mud addition differs from the rate of solids removed from down the hole.

GENERAL DISCUSSION OF THE PRESENT INVENTION

U.S. Pat. No. 4,455,869, from which this is a continuation-in-part application, in that patent, the inventors claim a process for determining the configuration of a borehole by introduction of liquid nitrogen into the borehole under a given temperature and pressure, and by monitoring the weight loss of nitrogen from a storage tank into the borehole, and monitoring the movement of the interface of the nitrogen, the configuration of the borehole can be determined as a function of that weight loss under the known given temperature and pressure. Prior to the issuance of the patent, applicants submitted a continuation-in-part application, presently pending, which claimed the process for determining leakage from the cavity or wellhead following the introduction of the nitrogen into the borehole, by allowing the nitrogen interface to remain static over a given period of time, and from the relative upward or downward movement of the nitrogen interface, the relative location of the leakage could be determined from the movement of the interface, and the amount of leakage could be determined from the distance of movement as a function of the configuration of the borehole.

The embodiment of the invention, in this continuation-in-part application, presents the processes as claimed in the patent and presently pending in the continuation-in-part application and in addition introduces a novel step in the methods for weighing the nitrogen as it is being introduced into the borehole.

As claimed in U.S. Pat. No. 4,455,869, the nitrogen was placed into a storage tank, and the entire weight of the nitrogen and tank was ascertained, so that any use of nitrogen could be monitored as the amount of nitrogen being introduced into the borehole. This method required a rather substantial storage tank, suspended from a particular type of scale so that the weight could be constantly monitored and the weight loss could be ascertained. This particular method was rather cumbersome, with the use of the scales requiring machinery in order to set the scales and tank into position for use. Under the present invention, rather than the use of scales and storage tank, what is provided is a flow meter apparatus which measures the direct mass flow of an inert gas, such as nitrogen, through the pipeline, and presents preferably a digital readout of the number of pounds of inert gas being introduced into the borehole through the line. Therefore, it is not necessary to know the actual total weight of the nitrogen prior to introduction into the borehole, and in face, the inert gas may be pumped through a line available at the site, without actually have to have it stored in a tank. In fact, any gas such as propane, methane or the like could be measured in terms of pounds of weight with the use of the flow meter, but because of the relative inertness and safety of the nitrogen, nitrogen gas is preferably utilized. Of course, the other steps in the process of monitoring the nitrogen interface as it moves down the borehole, measuring the movement of the nitrogen down the borehole and determining the position of the interface at predetermined levels is maintained in the process, whereby ultimately the configuration of the borehole is determined, and from that, any movement of the nitrogen interface over a period of time could indicate the location and amount of leakage occurring in the cavern or wellhead.

Therefore, it is an object of the present invention to provide a method for determining the erosion within a cavern or borehole.

It is a further object of the present invention to provide a method for accurately determining the shape of a borehole through the calculating of predetermined qualities of an inert gase as it moves between predetermined intervals down the borehole.

It is still a further object of the present invention to provide a system whereby the weight of an inert gas flowing into the borehole enables one to calculate the erosion that has occurred within an underground cavity.

It is yet a further object of the present invention to provide a system for providing liquid inert gas, from either a storage tank or a gas line, measuring the weight of the inert gas as it is moved into the cavern to be measured, and providing means for monitoring the movement of the inert gas down the borehole.

It is still a further object of the present invention to provide a method for determining the configuration of the borehole from the weight of the inert gas between certain intervals within the borehole, further calculating and graphing the shape of the borehole from these factors.

It is still a further object of the present invention to provide a method for detecting leakage within the storage cavity or the wellhead, as a result of upward or downward movement of the nitrogen interface in conjunction with the relative configuration of the borehole having been determined.

In order to accomplish the above-stated objects of the present invention, it is a feature of the present invention to provide an inert gas such as nitrogen for pumping down a borehole in order to measure the shape of the borehole.

It is still a further feature of the present invention to provide a pumping means to pump the liquid nitrogen into the borehole as gaseous nitrogen.

It is still a further feature of the present invention to provide a wire line means in order to determine the depth of the movement of the interface of the nitrogen down the borehole at predetermined intervals.

It is still a further feature of the present invention to provide a flow meter apparatus for measuring the weight of nitrogen being introduced into the borehole during the testing procedure.

BRIEF DESCRIPTION OF THE DRAWINGS

For a further understanding of the nature and objects of the present invention, reference should be had to the following detailed description, taken in conjunction with the accompanying drawings, in which like parts are given like reference numbers, and wherein.

DETAILED DESCRIPTION OF THE PREFERRED EMBODIMENT

Figure 1:
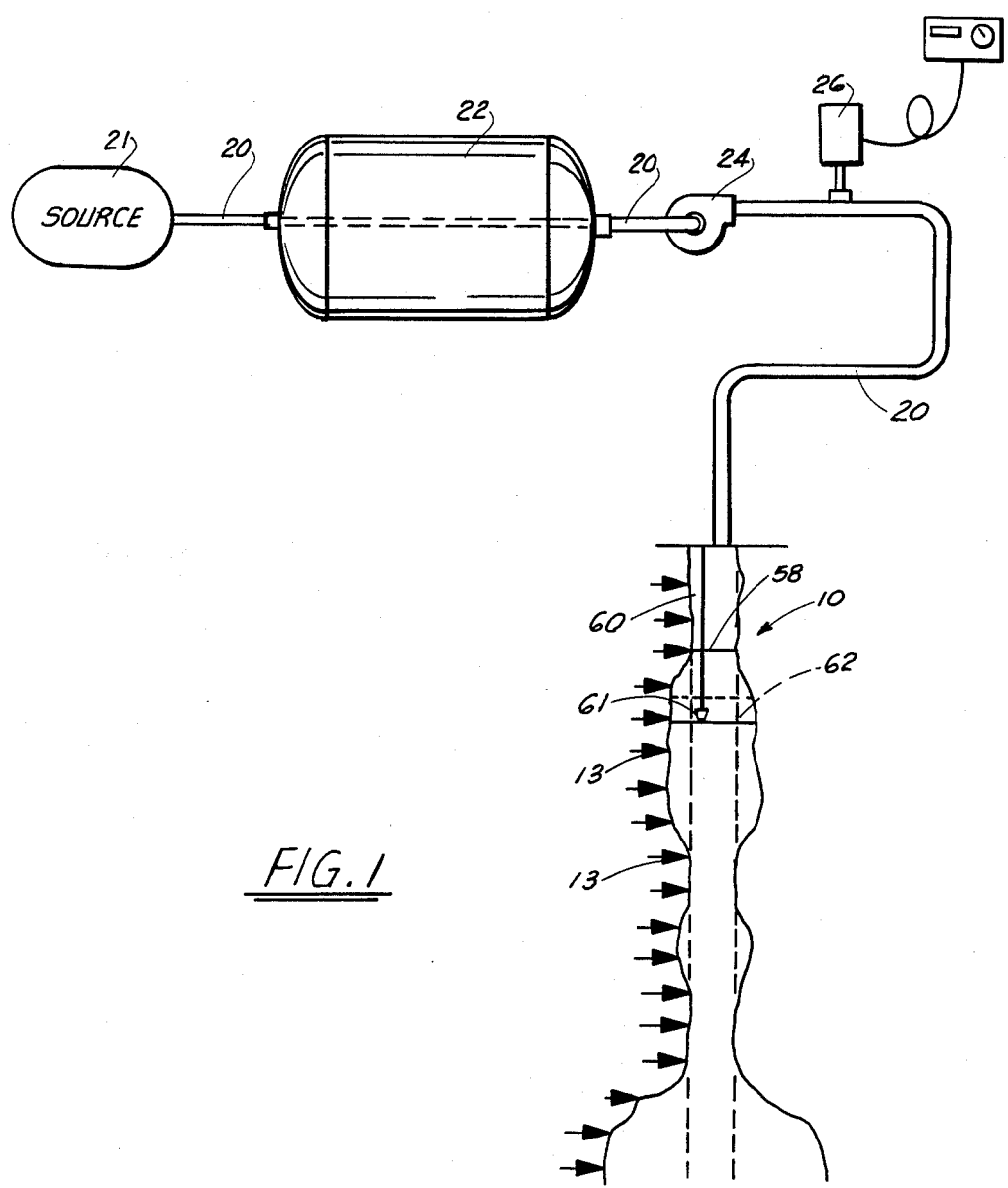
FIG. 1 is an overall view of the preferred embodiment of the apparatus utilized in the preferred embodiment of the method of the present invention.

FIG. 1 best illustrates the preferred embodiment of the apparatus utilized in the method of the present invention. There is illustrated in FIG. 1 borehole and/or cavern 10 which is the subject matter to be measured under the present method. As is illustrated, borehole 10 would have its starting point at ground level 12 and would in most cases for a reasonable distance down as indicated by numeral 13 be a straight sided borehole, having remained intact for a certain distance down the hole. However, as further illustrated, there is a possibility, and often it is the case, that the straight walls as indicated by numeral 13, the borehole would become eroded due to the passage of minerals, salt water or the like up and down and up the borehole, with erosion areas 14 and 15 being illustrated in order to show the extent of erosion that may occur down the borehole. As was stated earlier, it is imperative that in the safe use of these boreholes in order to fill the storage cavern 16, that the extent of the erosion 14 and 15 be determined accurrately. The result of this determination may result in the drilling of an additional borehole due to the fact that the present borehole is non-usable.

The preferred embodiment of the apparatus and the method utilized in the present invention is illustrated in FIG. 1. In order to accomplish an accurate measurement of erosion, as seen in FIG. 1, there is provided a flow line 20 which would provide liquid nitrogen or other inert gas, or possibly other fluids, from a source 21 to be utilized in testing under pressure and to be ultimately introduced into borehole 10. As seen in the FIGURE, if there is no source 21 of gas, then there could be provided a tank portion 22, which, would be utilized rather than line 20 for providing the source of inert gas. The tank of inert gas could be provided on the well site, and the nitrogen would be pumped under pressure from tank 22 into the borehole. Utilizing either source, the inert gas, preferably nitrogen, would be pumped via pump 24 further through line 20 into borehole 10. As further seen in FIG. 1, prior to entering borehole 20, nitrogen gas within line 20 would be pumped through a flow meter apparatus 26, or equivalent type of apparatus, which would have the ability to register the total weight in pounds of nitrogen moving through the line as a direct mass flow measurement through flow meter 26. The type of flow meter in question would be of the type manufactured by Micromotion, which is a well-known type of meter for measuring mass flow rates of liquids, gases and slurries provided the exact pounds of liquid flowing therethrough. In this method, following the measurement of the pounds moving through flow meter 26, the nitrogen or other fluid is then introduced into borehole 10 via line 20 as seen in FIG. 1.

As was stated earlier, in the parent U.S. Pat. No. 4,455,869, the method in that patent required a rather substantial storage tank, suspended from a particular type of scale so that the weight can be constantly monitored and the weight loss can be ascertained. This particular method was rather cumbersome with the use of the scales requiring machinery in order to set the scales of the tank into position for use. The process which utilizes the flow meter in the present invention, rather than the use of scales and storage tank, provides a means which is a more efficient and means for measuring the direct mass flow of the inert gas, such as nitrogen, through the pipeline, and presents a preferably digital readout at readout means 27 of the number of pounds of inert gas being introduced into the borehole through the line. This is a significant accomplishment in this particular process, and adds a much improved step in the overall measurement involved and the overall process itself.

As the liquid nitrogen is moved through reciprocating pump 24, the liquid nitrogen has been converted into gaseous nitrogen, preferably under 80° to 100° F., and at a predetermined pressure and temperature, the gaseous nitrogen, having flowed through flow meter 26 and the weight is being determined in the flow, the gaseous nitrogen is then transported into borehole 10, via line 20.

The gaseous nitrogen at that temperature, once entering borehole 10 will move down the borehole 10 with a very concise horizontal interface at point 58, so that as more nitrogen gas is pumped, the interface 58 continues to move down borehole 10. In order to accurately monitor the position of the interface as it moves down borehole 10, there is provided wire line 60 which is a conventional wire line and has a means 61 for recording the position of interface 58 at given intervals within borehole 10. In the preferred embodiment of the present invention, the position of interface 58 down borehole 10 is measured (at one foot or more intervals), and these intervals (ARROWS 63) would be determined by the use of wire line means 61. An operator, who is monitoring the movement of wire line 60 down the borehole, informs a statistician the position of wire line 60 at each interval, at which point the statistician records the digital readout of the weight of the nitrogen unit, which would be a reduced weight as more nirogen gas is being pumped into the borehole.

Of course, when the interface reaches an erosion point such as point 62, since there is a greater width to borehole 10, at this point, a greater loss weight of nitrogen would be recorded at this interval than would have been at earlier intervals when borehole 10 was in the normal configuration. That being the case, the statistician would record this greater weight loss as he would continually down the movement of interface 58 down borehole 10, until nitrogen interface 58 has reached the point that the test is completed.

Following the recording of the various weight changes down the borehole during the test, given the known pressure of the nitrogan gas, the temperature of the gas, and the weight change in the gas, one is able to calculate the area that that gas is occupying, and thus able to plot the configuration of the walls of the borehole.

There may be further provided computer means wherein the information of the gas pressure, temperature, and weight is entered into the computer, and the computer would calculate the area involved, and graphically represent the shape of the borehole on a screen or the like as provided by the computer. As ancillary use, following the completion of the test, often times the nitrogen gas is maintained within the borehole on the pressure, and from the change in the pressure of nitrogen gas over an extended period of time, one may determine the amount of leakage that is occurring within the borehole, and thus because of leaks which have developed doen the borehole, the borehole, other than the erosion factor, may be unusable if in fact there is a great deal of leakage occuring from the walls of the outermost top portion of the borehole. This further use will be described more fully in discussion of FIG. 2 in the present application.

There is provided for further edification a chart which represents the use of the nitrogen down the borehole, and the results of those tests as the nitrogen moves down the borehole.

| SCALE: LBS. NITROGEN | LBS,N2 USED PER INTERVAL | INJECTED IN WELL S.C.F.N2 | INTERFACE WELL DEPTH |
|---|---|---|---|
| 10,036 | 44 | 607.2 | 1780 |
| 9,992 | 44 | 607.2 | 1780 |
| 9,870 | 122 | 1683.6 | 1840 |
| 9,780 | 90 | 1242 | 1860 |
| 9,690 | 90 | 1242 | 1880 |
| 9,606 | 84 | 1159.2 | 1900 |

As illustrated in the above graph, as examples of the method utilized in the present invention, if the starting weight of the liquid nitrogen is shown as 10,036 pounds in column 1, a total of 44 pounds would occupy a twenty foot interval in the borehole, injected at 607.2 S.C.F. at a depth of 1780 feet. Moving down the column, at a depth of 1900 feet the amount of nitrogen necessary to occupy the same twenty foot interval is measured at 84 pounds injected at 1159.2 S.C.F. The results of this differential in the two examples illustrate that in the letter case, the borehole or cavity has eroded to an area whereby substantially twice the amount of gaseous nitrogen is required to occupy that same twenty foot interval. As this measurement is taken at consecutive predetermined intervals to a predetermined depth, one then is able to plot, either manually or with the aid of a computer the visual configuration of the borehole or cavity throughout the entire depth.

In addition to the method for determining borehole or cavity configuration through inert gas interface, the particular system also provides a method for detecting any measureable leakage in the borehole during the inert gas interface process as described earlier. This process is entitled the "NITRAC SM Testing Method" (NITRAC is a servicemark of Testrac, Inc.).

The NITRAC SM testing method is based on placing an accurately measured quantity of liquified gases—preferably nirogen gas, at a given test pressure, in the wellbore below the well casing seat following the placement of brine therwithin. The nitrogen/brine interface is observed over a specified time period.

Movement of the nitrogen/brine interface is detected by wireline logging using tools specifically designed for this purpose. The interface will remain at the same elevation or move. Movement is most likely to be in the upward direction and one of two persumptions is valid: the negative volumetric change indicated is attributable to system causes, such as pressure increase, and does not represent leakage; or the negative volumetric change is not attributable to system causes and represents the loss of nitrogen from the system. The problem then reduces to locating and correcting the leak. Should the interface not move, the minimum detectable interface movement considered together with the measured unit volume and time between test measurements form the calculation basis for determining the minimum detectable leakage rate (MDLR). This rate must be sufficiently low to practically equate to an insignificant amount should it actually exist. A MDLR of 125 bbls per year is equivalent to a rate of 0.01 gallons per minute. Leakage rates of up to 1250 bbls per year can be considered under conditions which lower rate determinations may not be feasible.

The physical description of the well is obtained from the operator. The operator specifies the maximum anticipated operating pressure at the wellhead and at the casing seat of the specific well to be tested and the safety factor(s), i.e., the test pressure divided by the maximum allowable pressure measured at the same point, which he wishes to establish for the well. Personnel must rely solely on the judgement of the operator that no part of the system will fail at the test levels requested. Test procedures using operator furnished parameters are prepared and submitted to the operator for approval.

The well is isolated by use of bull plugs, blind flanges or skillets. Provisions are made for access valves to inject nitrogen, run logging tools and to attach pressure measuring devices. All recoverable stored product or protective pad materials should be removed from the well to be tested if the cavern is to be tested in any empty condition. If the test is to be conducted over stored liquid products, the elevation of the productbring interface is determined by density logging. The well is pressurized with brine to a pressure level determined by calculation. Pressurization should be completed at least 24 hours before nitrogen injection commences.

It is recommended that pressure recorders be connected to the nitrogen and brine sides of the wellhead to make a continuous record of these pressures throughout the test for documentation purposes. The recorders should be of the proper range and be deadweight calibrated prior to and after the test. Deadweight gauges or deadweight calibrated precision test gauges with rated accuracy of 0.25% of full scale will be used for official pressure reading. Pressures may be measured and recorded with electronic instruments of equivalent accuracy. Brine and nitrogen pressure measurements are to be taken in accord with the above as follows: prior to the start of nitrogen injection; when interface is identified at the casing seat; as each specified bore hole segment is filled with nitrogen; upon reaching test pressure and nitrogen elevation; when 24 hour interface log is made; and when the final interface log is made.

The logging unit with interface/density logging tool is rigged up on the well. A lubricator is used to pass the tool into the well. A base line log is made from a point 50 ft. (minimum) below the anticipated interface level to 50 ft. above the cemented casing seat. The logging tool is then positioned as directed by the test supervisor. The nitrogen tank and vaporizing unit are rigged up and connected to the product side of the wellhead. The beginning weight (tank tare weight) of the liquid nitrogen is taken. Nitrogen injection is started. The wellhead and nitrogen piping are carefully checked for leaks and any found are corrected. The nitrogen flow rate and temperature are controlled to meet test criteria. When the interface is detected at the first specified increment, the nitrogen and brine pressures are taken and the amount of injected nitrogen determined from the tank weight. The procedure is repeated for each specified increment until the casing seat is reached at which point injection is suspended for refill of the nitrogen tank, confirmation of static pressures and the amount of nitrogen used to fill the wellbore pipe. Nitrogen injection is then resumed and the open borehole is calibrated at specified intervals by taking nitrogen weights and pressures. Upon reaching the planned test pressure, the total weight of nitrogen injected is obtained and the interface depth is recorded by logging. The logging tool is removed from the well, the wellhead is shut in and all nitrogen connections are again checked for leaks.

Approximately 24 hours after reaching the planned test pressure, and the total weight of nitrogen injected has been obtained and the interface step has been recorded by logging, then the official "test start" interface depth is measured by logging and the pressures are measured in accordance with the deadweight gauges or deadweight calibrated precision test gauges with rated accuracy of 0.25% of full scale. Pressures may be measured and recorded with electronic instruments instruments of equivalent accuracy. The official length of the test is calculated from borehole date volume data to comply with the MDLR. At the designated time for the official "test stop" point the interface depth is again measured by logging and the pressures are measured again utilizing the deadweight gauges. It is preferable to use the same logging unit, logging tool and operator for all procedures to minimize uncertainties due to equipment characteristics. In some cases it may be necessary to run a temperature log as part of the process as described in this paragraph.

Pressure changes observed between the "test start" and "test stop" are used to make a volume adjustment and calculate the theoretical interface elevation. If the measured and the theoretical interface elevations match, the presumption that no nitrogen has been lost can be made and the system is without measureable leakage above the MDLR is valid. If a negative variance is found, the volume is calculated and prorated against time to derive a nitrogen leakage rate in terms of bbls/year. If this annual leakage rate is minimal, additional observations by logging may be advisable to confirm that the initial observations are representing leakage and not unexpected system responses.

If the interface upward movement is major and the volumetric change substantial, the presumption of leakage is valid. If the interface movement stops at the casing seat depth it can be inferred that the casing seat is leaking. If the interface moves above the casing seat depth, the leakage is occurring above the casing seat; however, casing seat leakage cannot be ruled out.

Figure 2:
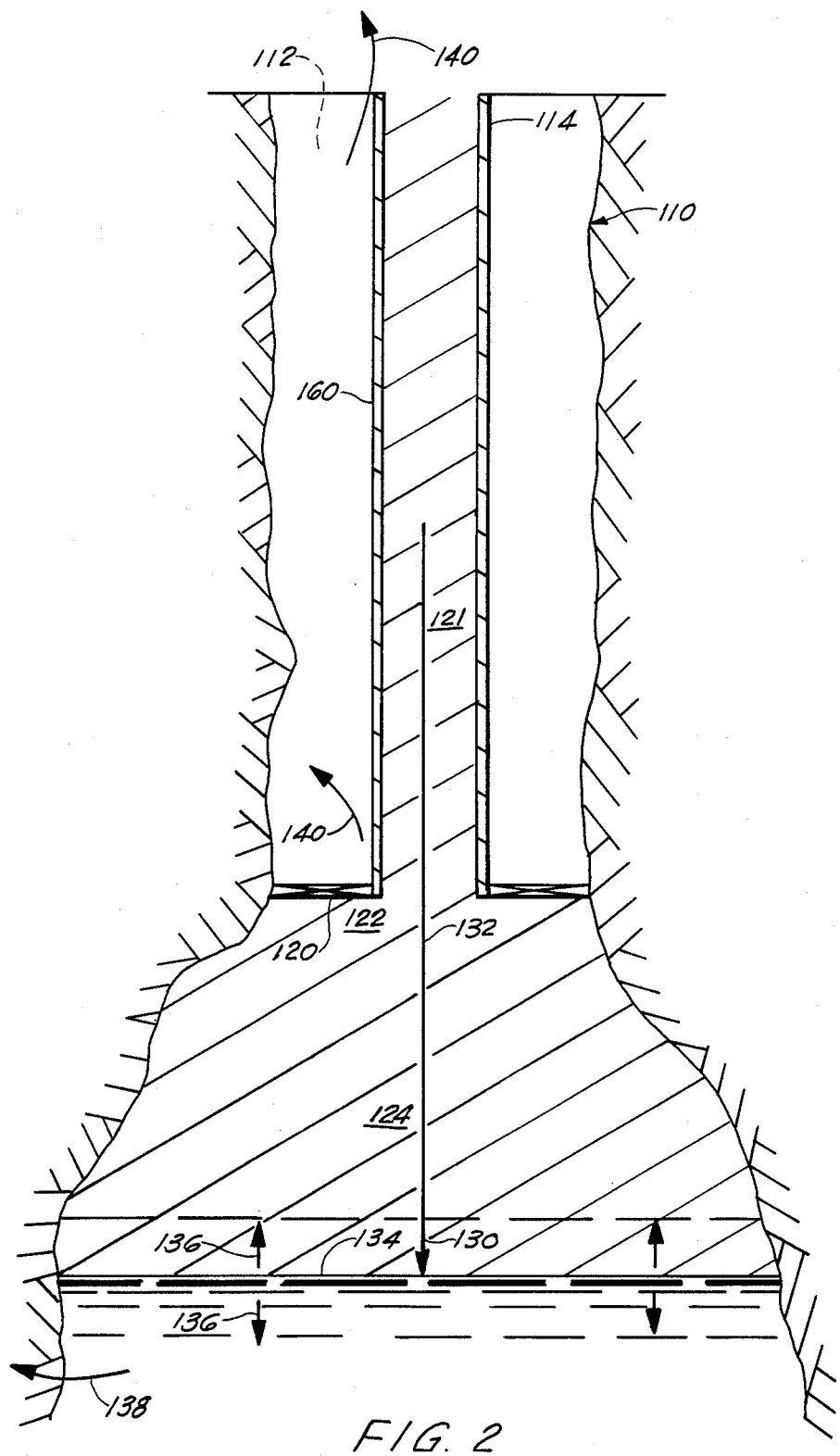
FIG. 2 is a view of the borehole illustrating the are of potential leakage in testing.

FIG. 2, as was referred to earlier, illustrates a blown up view of the NITRAC method of leakage detection as the preferred embodiment of the present invention. As is illustrated in FIG. 2, there is provided borehole 110 which is provided with an interior section of casing 114 which is generally a plurality of segments of metal pipe interconnected at joint 160 for defining a continuous casing within the borehole. As is seen in FIG. 2, there is an annular space 112 between the innermost wall of borehole 110 and the outermost wall of casing 114. At the lowermost end point of casing 114, there is provided a casing seat 120 which is substantially an enlarged flanged shoulder portion integrally connected to casing 120 for defining a means for disallowing fluid or the like from moving from that point 122 below the end portion of casing 114 to the annular space 112 of the FIGURE. Therefore, any fluid or the like moving up the borehole would be in effect required to travel within the annular space 121 of the hollow casing 114.

As was discussed earlier in the application, as nitrogen gas has been injected into borehole 110 and enlarged cavity 124, at that point that the nitrogen injected has been completed, the nitrogen gas is maintained under pressure within the borehole and detection means 130 positioned at the end of wireline 132, the nitrogen interface point 134 is detected, and monitored for upward or downward movement, as is illustrated by ARROWS 136. Therefore, in addition to the fact that the nitrogen interface can be utilized as a method for determining the configuration of a borehole, over an extended and defined period of time, preferably between 24 and 72 hours, if there is a leakage either in the bottom portion 138 of borehole 124, i.e., nitrogen gas leaking or brine leaking into an additional cavern through an interconnecting borehole or the like, the interface will move downward during this 72-hour period. Thus, there is a possibility that if this would occur, the cavity could not be used adequately for storage due to the leakage and would have to be abandoned. If in fact, the nitrogen interface moved upward during this 72-hour period, this would illustrate that there is leakage occurring either between the casing seat, therefore allowing flow between the wall of the casing and the wall of borehole 110, as illustrated by ARROW 140, or a leak occuring at the wellhead, for example a loose fixture or the like, or a leak occuring along the wall of the casing due to an improper weld or the like.

Therefore, utilizing the pressurized nitrogen in conjunction with monitoring the movement of the interface, one could determine the relative position of location of the leak, attempt to plug it and thus have the operation secured. This specification is incorporating by reference the "Mechanical Integrity Testing of Wells Using Nitrac SM Method", Copyright TesTrac, Inc. 1984, and is incorporated herein by reference thereto.

Because many varying and different embodiments may be made within the scope of the inventive concept taught, and because many modifications may be made in the embodiments herein detailed in accordance with the descriptive requirement of the law, it is to be understood that the details herein are to be interpreted as illustrative and not in a limiting sense.

What is claimed as invention is:

1. A method of determining the configuration of a borehole or cavity, which comprises the following steps:
   a. providing a flow of relatively inert fluid under a known pressure and known temperature;
   b. providing flow meter means for quantifying the weight of the flow of relatively inert fluid to be introduced into the borehole or cavity as a direct mass measurement;
   c. flowing a known weight of said fluid into the borehole or cavity to be configured;
   d. monitoring the weight of said fluid contained within the borehole or cavity between certain measured intervals within said cavity; and
   e. determining the area occupied by said fluid within at least one of said intervals with the cavity as a function of said weight of inert fluid under the known pressure and temperature within that interval.

2. The method in claim 1, wherein said relatively inert fluid is gaseous nitrogen.

3. A method of detecting leakage within a configured borehole or cavity, which comprises the following steps:
   a. providing a flow of relatively inert fluid under a known pressure and temperature into the borehole or cavity;
   b. quantifying the weight of said inert fluid flow with the use of flow meter means moving into the borehole or cavity as a direct mass flow measurement under the known pressure and temperature;
   c. locating the static position of the inert gas for establishing an interface within said borehole;
   d. monitoring the movement of said interface over a given period of time; and
   e. determining the location of leakage of said inert fluid from the relative upward or downward movement of said interface wherein upward movement of said interface indicates leakage at a point above said interface, and wherein downward movement of said interface indicates leakage at a point below said interface.

* * * * *